May 1, 1934. B. F. STITT 1,957,397
SPARK PLUG
Filed April 3, 1933
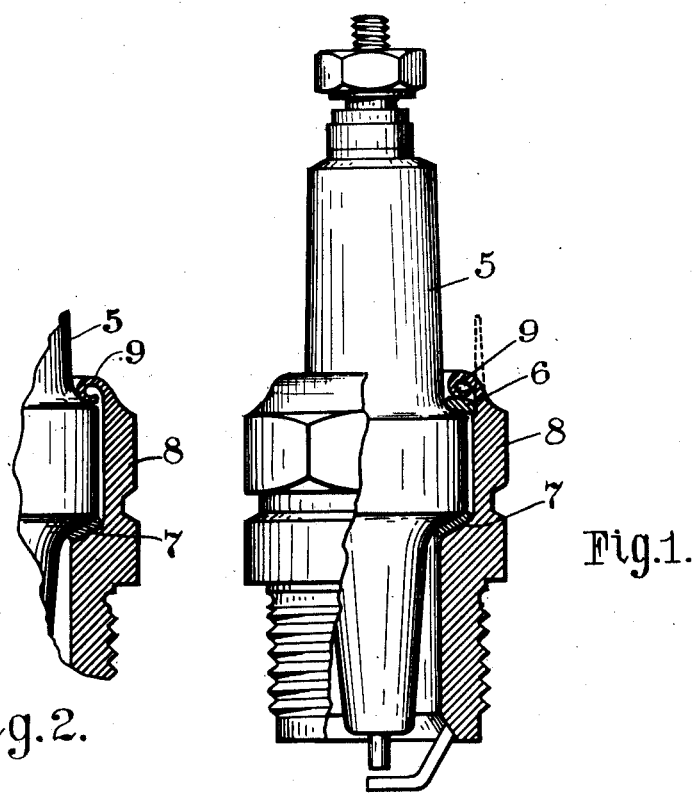
Fig.1.
Fig.2.
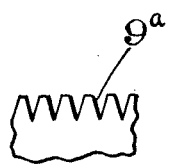
Fig.3.
Inventor
BENTON F. STITT
By
Attorneys Patented May 1, 1934

1,957,397

UNITED STATES PATENT OFFICE 1,957,397

SPARK PLUG

Benton F. Stitt, Columbus, Ohio, assignor to The Stitt Ignition Company, Columbus, Ohio, a corporation of Ohio Application April 3, 1933, Serial No. 664,092

3 Claims. (Cl. 123—169)

This invention relates to spark plugs for combustion engines.

Such plugs usually embody a porcelain core or insulator and a threaded shell of steel or other metal. It has been found difficult to seal the space between the core and the shell so as to prevent the escape of gases between them. A common expedient for this purpose is to employ gaskets of copper or other material each lodged on an annular shoulder on the core and to bend down a lip of the shell on the upper of the shoulders with a view to confining both gaskets in place. I have discovered that this practice does not satisfactorily effect the holding of the gasket in place for the following reasons. When a piece of metal is flexed, especially metal having considerable resilience, there is always some reaction from the position to which it is flexed even though the metal is permanently bent in flexing it. Therefore when the lip on the shell is bent, according to the prior practice in toward the gasket as far as it can go there is a reaction of the lip away from the gasket leaving it out of contact with the gasket, and therefore under varying temperatures does not hold compression. The object of my invention is to form a bent lip in which the reaction is toward the shoulder or gasket on the core and therefore in position to press the gasket and hold it tightly by the spring reaction of the metal whether the plug is hot or cold. Other objects will appear herein.

The invention is embodied in the examples herein shown and described, the features of novelty being finally claimed.

In the accompanying drawing—

Figure 1 illustrates in side view and partial section a spark plug in accord with my invention.

Fig. 2 is a fragmentary view of a modification of the construction shown in Fig. 1.

Fig. 3 is a modification of the lip.

In the views 5 designates a porcelain core, it having the usual upper and lower annular shoulder to receive gaskets 6 and 7 respectively. 8 designates the shell having an annular lip primarily in upright position, substantially as shown by broken lines, Fig. 1, it being noted that said lip is made thinner by a bevel upward at the outer side from the base as shown in said view.

In accordance with my invention I bend or curl the lip all the way around the shell with a suitable tool or tools to form a loop (in cross section) as shown in full lines Fig. 1, so that the free edge is innermost and the reaction thereof toward or against the gasket thereby pressing the gasket against the shoulder and closing the space between the core and shell.

The binding of the lip and the pressure of the lip, as described, is usually such in my construction as to draw the shell up on the core and cause the lower gasket also to be bound between the lower shoulder of the core and shell and also close the space between the shell and core at that region.

In some instances it will suffice to rely on the pressure of the inturned lip on the upper shoulder of the core without a gasket there, and with or without a gasket on the lower shoulder. In Fig. 2 is shown the inturned lip pressing on the upper shoulder without a gasket and with a gasket between the shoulders of the core and shell. In such instance the pressure of the inturned lip on the upper shoulder tends to squeeze the gasket between the two lower shoulders. Because the lip is thinner at its margin where it lies under the base of the bent lip said margin alone acts as a spring yielding to expansion and contraction of the core and plug and thus exerting a continuous pressure on the washer. A further advantage is that because the lip is upwardly thinned it is more easily turned with the tools under the base of the lip.

In Fig. 3 is illustrated in side view a fraction of an unbent lip modified by providing its margin with serrations 9ª or V-shaped cut out portions to facilitate the bending of the lip into the position shown in Figs. 1 and 2.

The forms of the parts can be changed without departing from the gist of the invention as claimed.

What I claim is:

1. In a spark plug having a core provided with an annular shoulder and a metallic shell for said core, said shell having an annular lip thickened toward its junction with the shell and thinned at its margin portion, said lip bent into loop form in cross section over said shoulder of the core whereby there is provided an outer substantially rigid portion, and an inner resilient portion adjacent and opposed to said shoulder.

2. In a spark plug having a core provided with a shoulder and a metallic shell, means for binding a gasket on said shoulder consisting of an annular tapered lip extending from the shell and bent into loop form in cross section over said shoulder, the outer surface of said lip being primarily inclined to the axis of the shell whereby there is provided a substantially rigid portion at the outer exposed portion of the looped lip and an inner confined resilient portion adjacent to and opposed to said shoulder.

3. In a spark plug including a core provided with an upper and a lower annular shoulder, and a metallic shell for said core, said shell having a lower shoulder to engage the lower shoulder of the core and an upper lip thickened in its base and thinned in its margin and bent into loop form to reach inward over the upper shoulder of the core whereby upon expansion and contraction of said core said thin margin only yields to maintain contact of said margin with said shoulder or a gasket thereon.

BENTON F. STITT.